United States Patent
Wills (10) Patent No.: US 12,330,790 B2
(45) Date of Patent: Jun. 17, 2025

(54) AIRCRAFT PASSENGER SEAT UNIT WITH MOVABLE PANEL

(71) Applicant: Safran Seats GB Limited, Cwmbran (GB)

(72) Inventor: Paul Wills, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 222 days.

(21) Appl. No.: 17/631,138

(22) PCT Filed: Jul. 23, 2020

(86) PCT No.: PCT/GB2020/051755
§ 371 (c)(1),
(2) Date: Jan. 28, 2022

(87) PCT Pub. No.: WO2021/019209
PCT Pub. Date: Feb. 4, 2021

(65) Prior Publication Data
US 2022/0258865 A1  Aug. 18, 2022

(30) Foreign Application Priority Data

Jul. 31, 2019  (GB) .................................. 1910905

(51) Int. Cl.
*B64D 11/06* (2006.01)

(52) U.S. Cl.
CPC ........ *B64D 11/0606* (2014.12); *B64D 11/064* (2014.12); *B64D 11/0646* (2014.12)

(58) Field of Classification Search
CPC ............ B64D 11/0646; B64D 11/0643; B64D 11/0606; B64D 11/0602; B60N 2/245; B60N 2/986
See application file for complete search history.

(56) References Cited

U.S. PATENT DOCUMENTS 9,469,405 B2 * 10/2016 Henshaw ......... B64D 11/00153
10,501,188 B2 * 12/2019 Nicholas ............ B64D 11/0601
(Continued)

FOREIGN PATENT DOCUMENTS

EP  3546357 A1  10/2019
FR  3137662 A1 *  1/2024
(Continued)

OTHER PUBLICATIONS

International Patent Application No. PCT/GB2020/051755, International Search Report and Written Opinion, dated Oct. 27, 2020.
(Continued)

*Primary Examiner* — Joshua J Michener
*Assistant Examiner* — Ryan Andrew Yankey
(74) *Attorney, Agent, or Firm* — Kilpatrick Townsend & Stockton LLP (57) ABSTRACT

An aircraft passenger seat unit configured for use adjacent an aisle of an aircraft cabin is disclosed. The seat unit comprises a seat, a footrest, and a movable panel. The movable panel is movable with respect to the footrest between a closed position in which the movable panel at least partially encloses a side of the footrest and an open position in which the movable panel at least partially exposes the side of the footrest such that, in use, when the panel is in the open position, a passenger can access the seat from an aisle through the partially exposed side of the footrest.

16 Claims, 4 Drawing Sheets

(56) References Cited

U.S. PATENT DOCUMENTS

| | | | | |
|---|---|---|---|---|
| 11,299,274 B1* | 4/2022 | Davis | ............... | B64D 11/0644 |
| 11,312,494 B2* | 4/2022 | O'Neill | ............ | B64D 11/0606 |
| 11,345,476 B2* | 5/2022 | Dowty | ............ | B64D 11/0606 |
| 11,731,764 B2* | 8/2023 | Katakura | ........... | B64D 11/0606 |
| | | | | 297/217.3 |
| 11,794,902 B2* | 10/2023 | Pothier | ............... | A61G 3/0816 |
| 2013/0126671 A1* | 5/2013 | Guering | ............ | B64D 11/0606 |
| | | | | 244/118.6 |
| 2013/0241247 A1* | 9/2013 | Wallace | ............ | B64D 11/0604 |
| | | | | 297/118 |
| 2013/0241258 A1* | 9/2013 | Wallace | ............ | B64D 11/0641 |
| | | | | 297/354.13 |
| 2017/0259923 A1 | 9/2017 | Morgan | | |
| 2017/0283064 A1* | 10/2017 | Robinson | ............... | E05D 15/58 |
| 2024/0300651 A1* | 9/2024 | Dowty | .............. | B64D 11/0601 |

FOREIGN PATENT DOCUMENTS

| | | | |
|---|---|---|---|
| GB | 2572446 | A | 10/2019 |
| WO | 2013144845 | A2 | 10/2013 |
| WO | 2018078377 | A1 | 5/2018 |
| WO | 2018093825 | A1 | 5/2018 |

OTHER PUBLICATIONS

United Kingdom Patent Application No. 1910905.7, Search Report, dated Jan. 22, 2020.

* cited by examiner

Fig. 5

AIRCRAFT PASSENGER SEAT UNIT WITH MOVABLE PANEL

CROSS-REFERENCE TO RELATED APPLICATIONS

This application is a national stage application of International Patent Application No. PCT/GB2020/051755, filed on Jul. 23, 2020, and titled "Aircraft Passenger Seat Unit With Movable Panel," which is related to and claims priority to United Kingdom Patent Application No. 1910905.7, filed on Jul. 31, 2019, and titled "Aircraft Passenger Seat Unit With Movable Panel," both of which are hereby incorporated by reference in their entireties.

FIELD OF THE INVENTION

The present invention concerns aircraft passenger seat units. More particularly, but not exclusively, this invention concerns an aircraft passenger seat unit with a movable panel. The invention also concerns a shell suitable for use with an aircraft passenger seat unit.

BACKGROUND OF THE INVENTION

Business class seating generally aims to provide aircraft passengers with maximum comfort and privacy. However, the design of aircraft passenger seat units for business class seating is of course constrained by the limited availability of space within an aircraft cabin. The limited availability of space means that some aircraft seat unit configurations provide restricted access to the aircraft seats contained therein, which can pose a problem for persons with reduced mobility, especially wheelchair users.

Furthermore, United States Department of Transportation rules require that at least fifty percent of all aisle-seats within an aircraft cabin are able accommodate persons with reduced mobility. The cabin of an aircraft must satisfy this requirement if the aircraft is to operate from, or transit through the USA.

The present invention seeks to mitigate the above-mentioned problems. Alternatively or additionally, the present invention seeks to provide an improved aircraft passenger seat unit.

SUMMARY OF THE INVENTION

The present invention provides, according to a first aspect, an aircraft passenger seat unit, configured for use adjacent an aisle of an aircraft cabin. The seat unit comprises a seat, a footrest, and a movable panel. The movable panel is movable with respect to the footrest between a closed position in which the movable panel at least partially encloses a side of the footrest and an open position in which the movable panel at least partially exposes the side of the footrest such that, in use, when the panel is in the open position, a passenger can access the seat from an aisle through the partially exposed side of the footrest.

When in the closed position the movable panel may at least partially enclose the side of the footrest configured to be side adjacent an aisle. In use, the movable panel may block access from an aisle to the footrest when in the closed position.

The invention provides a seat unit comprising a movable panel that is movable to provide access to the foot rest from a side of the seat unit where such access would normally be blocked by the panel. A passenger can thereby access the seat from an aisle through the partially exposed side of the footrest. For example, a passenger could sit upon the seat and move their legs into the seat unit via the exposed side of the foot rest. Such an arrangement is particularly advantageous for passengers with reduced mobility, for example wheelchair users or those requiring a helper, who, due to restricted space within the seat unit, may find it difficult to access the seat and/or foot rest without a side of the footrest being exposed.

The seat unit may be a business class seat unit. The seat may comprise a seat pan and a backrest, the seat having an upright sitting configuration in which the backrest is substantially upright. The upright sitting position of the seat may be a taxi, take-off and landing (TTL) position. The seat may have a lie-flat bed-mode configuration in which the back rest is reclined to a position in which it is substantially parallel and level with the seat pan.

Preferably the seat is movable in an upright sitting configuration between a first position in which the seat pan is spaced apart from the footrest by a first distance, and a second position in which the seat pan is spaced apart from the footrest by a second distance. The second distance may be less than the first distance, The second distance may be no more than 15 centimetres. Advantageously the second distance is no more than 10 centimetres. Preferably the second distance is substantially zero, such that seat pan and footrest are substantially in contact with one another when the seat is in the second position. Preferably the seat pan and footrest form a contiguous surface when the seat is in the second position. Preferably the first distance is more than 30 centimetres. The first position of the seat may correspond to a taxi, take-off, and landing position.

The seat may face in a direction defining a seat axis. The seat may be movable along the seat axis towards or away from the footrest when the seat is moved between the first and second positions. The seat may face in a direction towards the first side of the seat unit. The seat may be configured to face in a direction towards an aisle of an aircraft cabin.

In a preferred arrangement the seat is moveable in an upright configuration from a first position to a second position in which the seat pan closer the footrest so that, in use, a passenger can more easily access the seat from an aisle of the aircraft. Furthermore, if there is not enough room between the seat pan and the footrest for a passenger's legs when the seat is in the second position, the movable panel can be moved to the open position so that the passenger's legs can be moved into the seat unit and their feet placed upon the footrest. A passenger with reduced mobility can thereby sit upon the seat pan directly from aisle, without having to first enter the space within the seat unit. This arrangement is particularly advantageous where the passenger is a wheelchair user because the passenger can be transferred from an aisle adjacent the seat unit directly into the seat in an upright sitting position.

Preferably the seat unit has an aisle side that is configured to be adjacent an aisle in use. Advantageously the movable panel is positioned along the aisle side of the seat unit when in the closed position such that movable panel at least partially encloses the side of the footrest to block access to the side of the footrest from the aisle, and such that when the panel is in the open position a passenger can access the partially exposed side of the footrest from the aisle.

The aircraft passenger seat unit may further comprise a wall. Preferably the wall at least partially encloses a side of the seat when the seat is in the first position, the wall thereby blocking access to the seat from an aisle when in the first position. Preferably the wall does not enclose the side of the seat when the seat is in the second position so that a passenger can access the seat from an aisle when the seat is in the second position. The wall may be a privacy screen. The wall may be a console.

In prior art seat units a privacy screen or console is often positioned between the seat and the aisle to enclose the seat unit and provide the seat unit with privacy. In such arrangements, a passenger can only access the seat from an aisle by moving into the space directly in front of the seat. In a seat unit arrangement comprising a wall where there is limited space within the seat unit for wheel chair access, or for a passenger and a helper, a preferred embodiment of the invention provides an arrangement in which it is possible to bring the seat to a position in which it is directly adjacent to the aisle, and no longer blocked by the wall.

Advantageously the movable panel and wall are spaced apart along a first side of the seat unit and the space between the movable panel and wall defines an access path that provides passenger access into the seat unit from the first side of the seat unit. Preferably the seat is adjacent to the access path when in the second position so that a passenger can access the seat from a first side of the seat unit via the access path when the seat is in the second position. The first side of the seat unit may be an aisle side configured to be positioned adjacent an aisle in use.

The seat unit may comprise a console comprising a table surface for use by a passenger of the seat unit. The console may be at least partially formed by the wall. The console may comprise an upper surface forming a table surface. The console may stow a deployable meal table.

Preferably the aircraft passenger seat unit is configured to be positioned directly adjacent to and in front of a further, substantially identical aircraft seat unit, wherein the console is at least partially formed by the movable panel of the further seat unit. The seat unit may be a first seat unit. The further seat unit may be a second seat unit. The footrest of the second seat unit may be positioned within the console of the first seat unit.

Preferably the seat unit comprises a shell, wherein the shell forms a console of the seat unit and a movable panel of the further seat unit. The shell may further comprise a dividing wall that is configured to be positioned at the rear of the aircraft passenger seat unit, between the seat unit and the further seat unit.

The movable panel may be movably mounted via a hinge. The movable panel may function as a footrest access door. The movable panel may be mounted via a hinge and configured to be moved between the closed position and open position about a horizontal axis located towards the bottom of the panel. The hinge may be positioned along a bottom edge of the movable panel. The movable panel may be mounted via a hinge and configured to be moved between the closed position and open position about a vertical axis located towards a side of the panel. The hinge may be positioned along a side edge of the movable panel. The movable panel may be mounted via a hinge to a wall at least partially forming a foot well in which the footrest is contained. The movable panel may at least partially form the foot well when the movable panel is in the closed position. Where the movable panel forms part of a shell, the movable panel may be mounted to the remainder of the shell via a hinge.

Preferably the seat unit comprises a lock system configured to lock the movable panel in the closed position. The lock system may comprise a plurality of latches positioned on the movable panel and configured to engage with a structure of the seat unit to lock the movable panel in the closed position. Alternatively, the lock system may comprise a plurality of latches positioned on a structure of the seat unit and configured to engage with the movable panel to lock the movable panel in the closed position. The structure may be a shell. The structure may be one or more walls. The one or more walls may form at least part of a foot well of the seat unit. The plurality of latches may be positioned along the top, bottom, and/or both side edges of the movable panel. There may be four latches. There may be two latches positioned along a top edge of the panel. There may be two latches positioned along a bottom edge of the panel. There may be two latches positioned along each of two opposing side edges of the panel.

Advantageously the lock system comprises an actuatable member operable to disengage the latches so that the movable panel can be moved from the closed position to the open position. The actuatable member may be a release handle. The actuatable member may be a button. The actuatable member may be a lever. Preferably the actuatable member is positioned on a surface of the movable panel that is adjacent the footrest when the panel is in the closed position. The panel may comprise an aisle-side surface and an opposite, non-aisle-side surface. The aisle-side surface may be positioned adjacent an aisle of an aircraft cabin in use when the movable panel is in the closed position. The non-aisle-side surface may be positioned adjacent the footrest in use when the movable panel is in the closed position. The actuatable member may be positioned on the non-aisle-side surface of the movable panel. The actuatable member may be located within a foot well when the movable panel is in the closed position.

The present invention provides, according to a second aspect, a shell for an aircraft passenger seat unit according to the first aspect of the invention. The shell comprises a movable panel, a footrest, and a console. The movable panel and footrest are suitable for forming the movable panel and footrest of a first seat unit, the movable panel being movable with respect to the footrest between a closed position in which the movable panel at least partially encloses a side of the footrest at a first side of the shell and an open position in which the panel at least partially exposes the side of the footrest at the first side of the shell. The console is suitable for forming the console of a second, directly adjacent seat unit. The movable panel of the first seat unit at least partially forms the console of the second seat unit.

The present invention provides, according to a third aspect, a kit of parts configured such that when assembled, the kit of parts forms an aircraft passenger seat unit according to the first embodiment of the invention.

It will of course be appreciated that features described in relation to one aspect of the present invention may be incorporated into other aspects of the present invention. For example, the shell according to the second aspect of the invention may incorporate any of the features described with reference to the aircraft passenger seat unit of the first aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
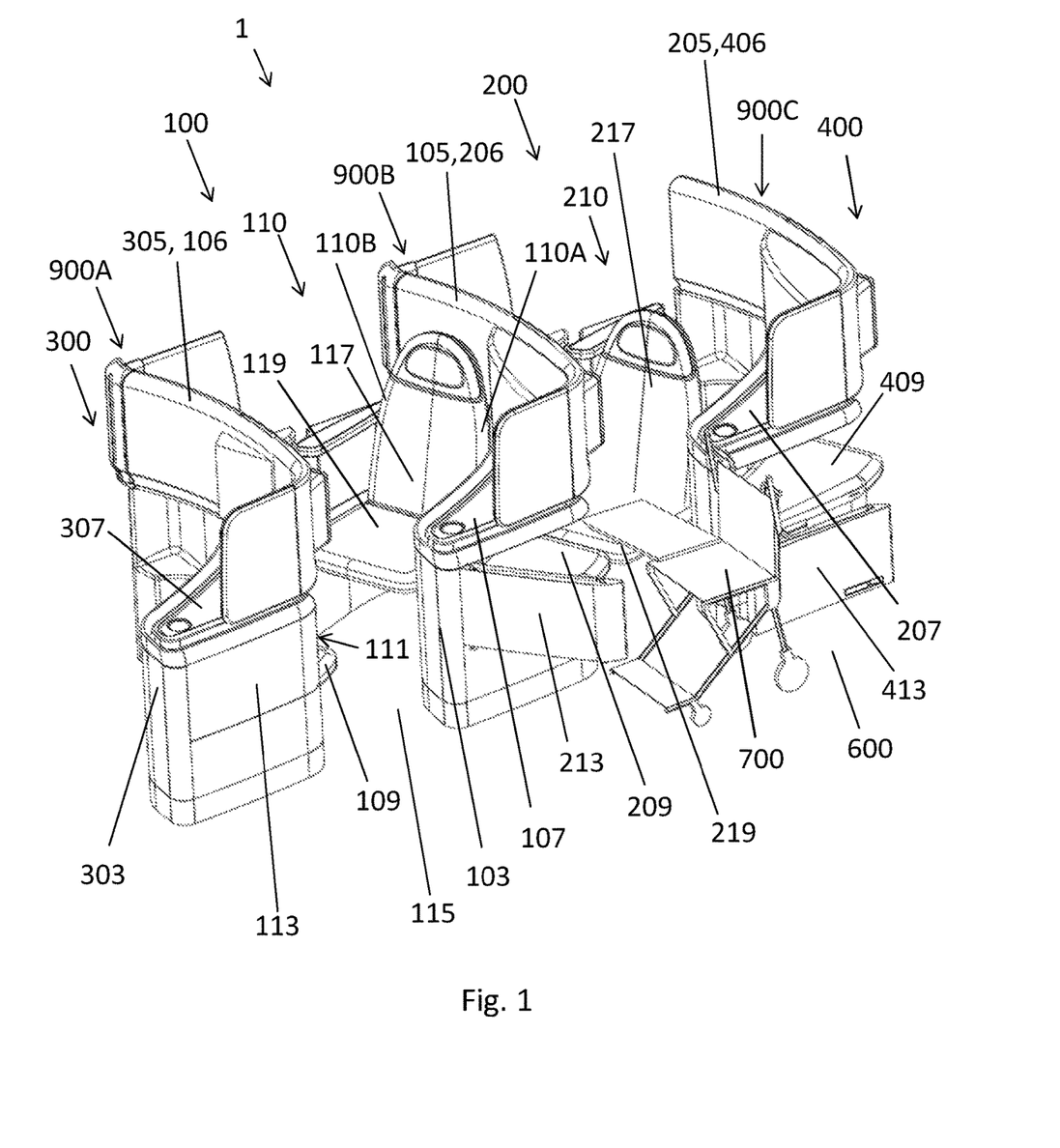
FIG. 1 is a perspective view of an aircraft cabin comprising a first aircraft passenger seat unit according to an embodiment of the invention positioned directly adjacent to and in front of a second, substantially identical aircraft passenger seat unit.

A first aircraft passenger seat unit 100 according to an embodiment of the invention is shown in FIG. 1 positioned directly adjacent to and in front of a second, substantially identical seat unit 200. The seat units 100, 200 are arranged in a column adjacent an aisle 600 in an aircraft cabin 1. Because the seat units 100, 200 are substantially identical only the first seat unit 100 will be described. However, in FIGS. 1 to 4 features of the second seat unit 200 that are in common with the first seat unit 100 have been labelled with the same reference numeral but with the prefix "2" instead of "1". For example, the second seat unit 200 comprises a seat 210 whereas the first seat unit 100 comprises a seat 110. A third substantially identical seat unit 300 and a fourth substantially identical seat unit 400 are also partially shown in FIGS. 1 to 5, where the third seat unit 300 and fourth seat unit 400 have features that are in common with the first seat unit 100, those features have been labelled with the same reference numerals but with the respective prefixes "3" and "4" instead of "1".

In the following description the term "aisle-side" is used to refer to the side of a feature of a seat unit that is closest to the aisle 600 and, similarly, "non-aisle-side" is used to refer to the side of a feature that is furthest away from the aisle 600. For example, the seat 110 of the seat unit 100 comprises an aisle side 110A that is closest the aisle 600 and a non-aisle-side 110B, on the opposite side of the seat 110 that is furthest away from the aisle 600.

The first seat unit 100 comprises a seat 110 that is enclosed at a front of the seat unit 100 by a first shell 900A and enclosed at a rear of the seat unit 100 by a second shell 900B. The first and second shells 900A, 900B are substantially identical and each comprise features that form part of the seat units positioned on either side of the respective shells 900A, 900B. For example, the second shell 900B comprises a partition that forms a rear privacy wall 105 of the first seat unit 100 and that also forms a front privacy wall 206 of the second seat unit 200.

The second shell 900B comprises a rear privacy wall 105 that is positioned between the first seat unit 100 and the second seat unit 200 to enclose the seat 110 of the first seat unit 100 at the rear of the first seat unit 100, and a console 103 that provides a table surface 107 positioned on an aisle-side 110A of the seat 110. The first shell 900A comprises a front privacy wall 106 that is positioned in front of the seat 110, between the first seat unit 100 and a third seat unit 300, the third seat unit 300 being positioned directly adjacent to and in front of the first seat unit 100 and being only partially shown in FIGS. 1 to 3. The first shell 900A also comprises a footrest 109 positioned within a foot well 111, the footrest 109 being positioned in front of the seat 110 and thereby being usable by a passenger of the seat 110. As can be seen from FIGS. 1 to 3, the foot well 111 of the first seat unit 100 forms the console 303 of the third seat unit 300.

Similarly, the foot well 211 of the second seat unit 200 forms the console 103 of the first seat unit 100.

Figure 2:
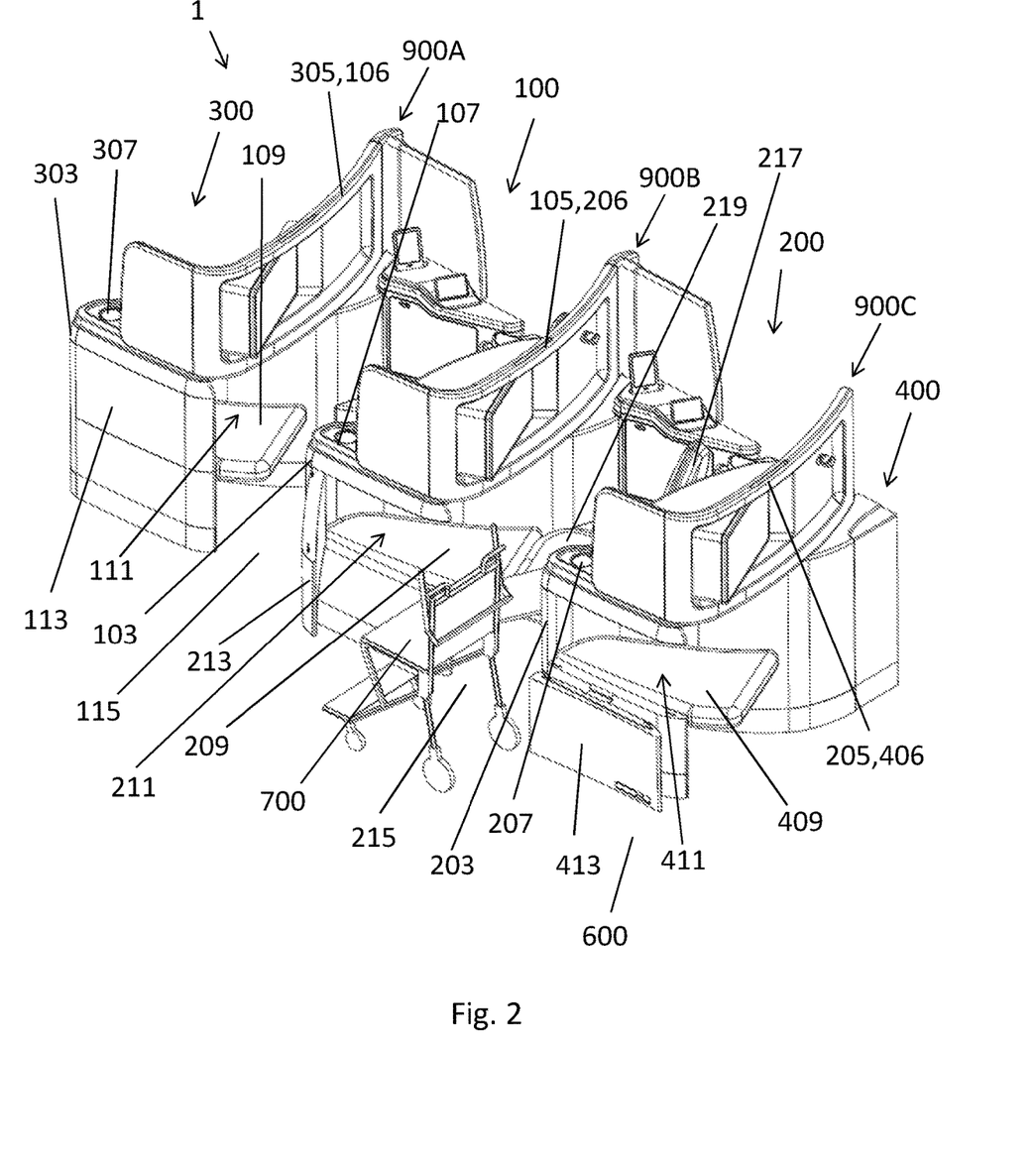
FIG. 2 is an alternative perspective view of the aircraft cabin arrangement of FIG. 1.

The foot well 111 is defined on an aisle-side by a movable panel 113 that encloses the footrest 109 on an aisle-side and which blocks access to the footrest 109 from the aisle 600, as can be seen in FIGS. 1 and 2. The panel 113 is spaced-apart from the console along the aisle-side of the seat unit 100 to define an access path 115 between the panel 113 and console 103, the access path 115 providing passenger access into the seat unit from the aisle 600.

Figure 3:
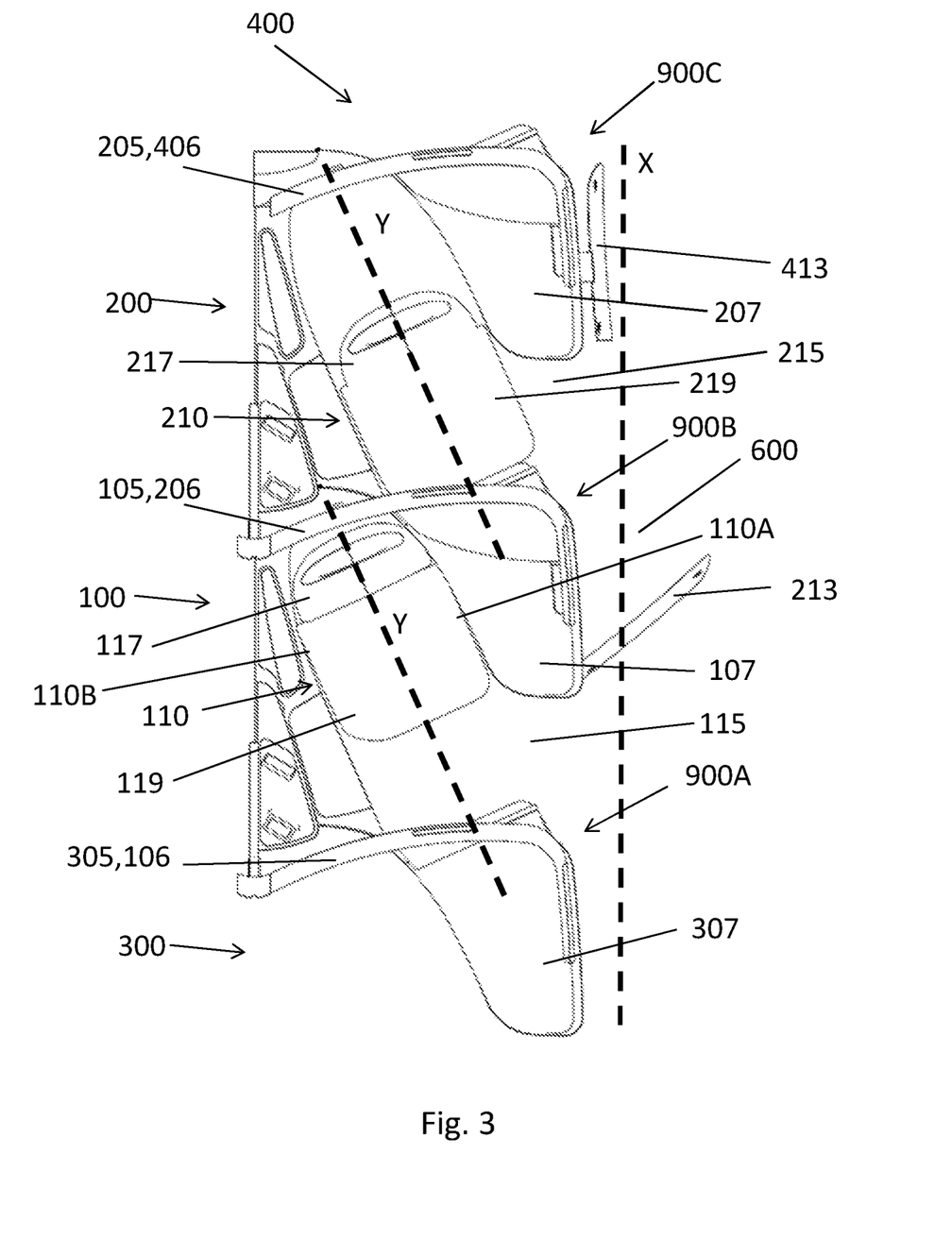
FIG. 3 is a plan view of the aircraft cabin of FIG. 1.

The seat 100 comprises an upright sitting configuration in which the back rest 117 is positioned substantially upright, as shown in FIGS. 1 to 3, and a lie-flat bed-mode configuration, which is not shown in the figures, in which the back rest 117 is reclined to a position in which it is substantially level with the seat pan 119.

With reference to FIG. 3, the aisle 600 defines a longitudinal axis X along the aircraft cabin 1 and the seat 110 faces towards the aisle 600 in a direction defining a seat axis Y, the seat axis Y being angled by approximately 22 degrees to the longitudinal axis X. To provide improved access to the seat 110 for passengers with reduced mobility, the seat 110 is moveable along the seat axis Y between a first position in which the seat is located towards the rear of the seat unit and a second position in which the seat is located towards the front of the seat unit. In FIGS. 1 to 3 the seat 110 of the first seat unit 100 is shown as in the first position, and the console 103 is positioned between the aisle-side 110A of the seat 110 and the aisle 600, thereby blocking direct access to the seat 110 from the aisle 600. In FIGS. 1 to 3 the seat 210 of the second seat unit 200 is shown as in the second position. The seat 210 has been moved forwards within the seat unit 200 so that the seat pan 219 of the seat 210 is positioned adjacent to the passenger access path 215 and so that the console 203 no longer blocks access to the seat 210 from the aisle 600.

With reference still to the second seat unit 200, which is shown in FIGS. 1 to 3 with the seat 210 in the second position, the seat pan 219 of the seat 210 is directly adjacent to and in contact with the footrest 209 when the seat 210 is in the second position. Therefore, with the seat 210 in the second position, the seat pan 219 and footrest 209 form a contiguous surface. In this configuration a passenger cannot sit upon the seat pan 219 facing in a direction along the seat axis Y with their feet resting upon the cabin floor because there is no room for the legs of the passenger between the seat pan 219 and the footrest 209. For this reason, the panel 213 that encloses the aisle-side of the footrest 209 is configured to be movable between a closed position in which the panel 213 encloses the aisle-side of the footrest 209 and an open position in which the panel 213 is moved to expose the aisle-side of the footrest 209 such that the aisle-side of the footrest 209 is accessible directly from the aisle 600. In FIGS. 1 to 3 the panel 113 of the first seat unit 100 is shown in the closed position and the panel 213 of the second seat unit 200 is shown in the open position.

Being configured as described with movable panels adjacent the respective footrests, the seat units are arranged to provide passengers with reduced mobility, for example wheelchair users, with easy access to their seats from the aisle 600. With continued reference to the second seat unit 200, to access the seat 210 directly from the aisle 600, the seat 210 must be moved from the first position into the second position and then the panel 213 must be moved from the closed position to the open position. A wheelchair 700 can then be positioned alongside the seat 210, as shown in FIGS. 1 and 2, so that a user of the wheelchair 700 can be transferred onto the seat 210 directly from aisle 600 and so that the legs of the wheelchair user can be transferred onto the footrest 209 directly from the aisle 600. The panel 213 can then be moved back to the closed position and the seat 210 can be moved back to the first position so that the wheelchair user is seated within the seat unit 200.

Figure 4:
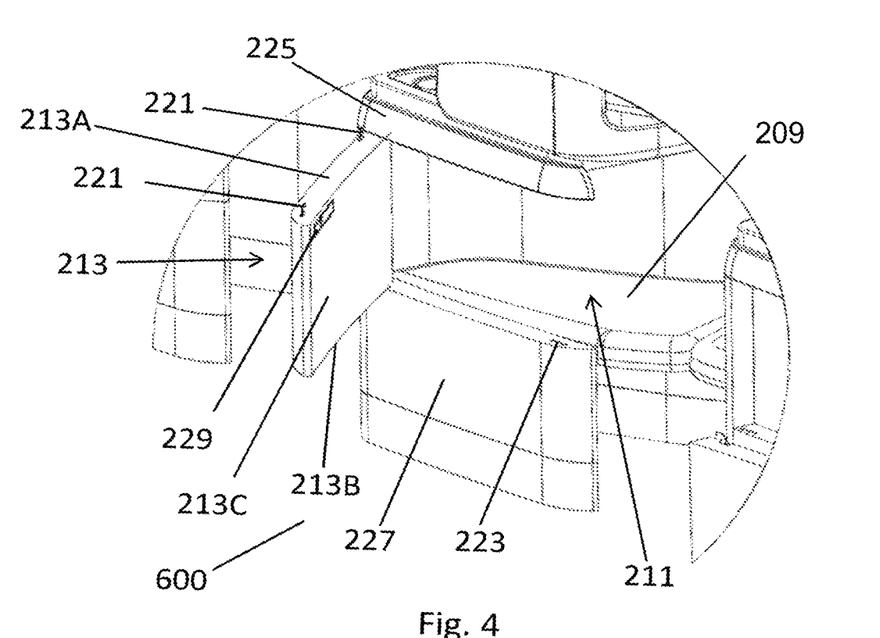
FIG. 4 is a detailed view of a movable panel of the second aircraft passenger seat unit.

The panel 213 of the second seat unit 200 is shown in more detail in FIG. 4. The panel 213 is mounted via a hinge positioned at a side edge of the panel 213 such that the panel 213 is openable and closable like a door. When the panel 213 is in the closed position the panel 213 is locked in place by a lock system comprising a plurality of latches 221 that are positioned on the panel 213 and that are configured to be received within and engage with corresponding apertures 223 located in upper and lower walls 225, 227 of the foot well 211 that are positioned respectively above and below the panel 213 when the panel 213 is in the closed position. Two latches 221 are spaced apart along an upper edge 213A of the panel, and two latches 221 are spaced apart along an opposite lower edge 213B of the panel. The lock system is operable via a handle 229 positioned on the non-aisle-side 213C of the panel 213 i.e. the side of the panel 213 that is within the foot well 211 and not adjacent the aisle 600 when the panel 213 is in the closed position. When the handle 229 is pulled, each of the four latches 221 retract into the panel 213. Therefore, to release the panel 213 and move the panel 213 from the closed position to the open position, the handle 229 must be pulled to retract and thereby disengage the latches 221. Similarly, when moving the panel 213 from the open position to the closed position, the handle 229 must be pulled to move the latches 221 into the panel so that the latches do not abut the walls 225, 227 positioned above and below the panel 213 and prevent the panel 213 from being moved to the closed position.

Figure 5:
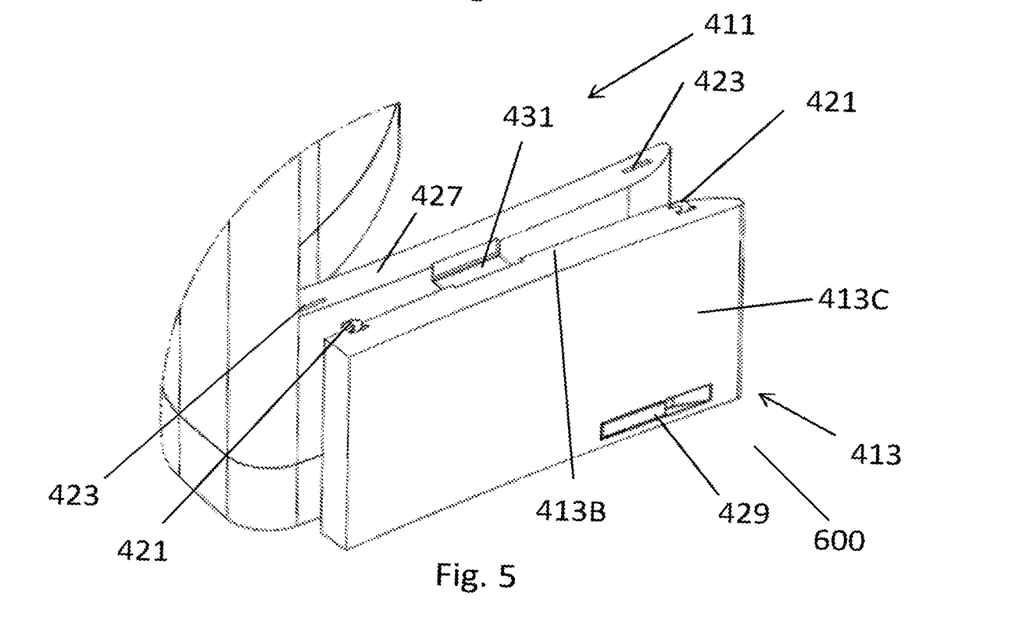
FIG. 5 is a detailed view of the movable panel of a fourth aircraft passenger seat unit.

As can be seen in FIGS. 1 and 2, a third shell 900C provides the console 203 of the second seat unit 200, said console 200 also forming the foot well 411 of a fourth seat unit 400, the fourth seat unit 400 being positioned directly adjacent to and behind the second seat unit 200 and being only partially shown in FIGS. 1 to 3. In FIG. 5, where the fourth seat unit 400 has features in common with the second seat unit 200 as depicted in FIG. 4, those features have been labelled with the same reference numerals but with the prefix "4" instead of "2". The fourth seat unit 400 comprises a moveable panel 413 comprising a locking system that is substantially identical to the locking system as already described with respect to the second seat unit 200. However, the panel 413 is mounted along its lower edge 413B to the lower wall 427 via a hinge 431 so that the panel 413 is folded into the aisle 600 and downwardly when moving the panel 413 from the closed position to the open position. The panel 413 is then folded upwardly and out of the aisle 600 to move the panel from the open position to the closed position.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft passenger seat unit, configured for use adjacent an aisle of an aircraft cabin, wherein:
    the seat unit comprises:
        a seat,
        a console,
        a footrest, and
        a movable panel,
            wherein the seat unit does not include a leg rest extending from the seat;
    the console is positioned on an aisle side of the seat unit and is spaced apart from the footrest along a longitudinal axis of the aircraft cabin to define an access path between the console and the footrest, the access path providing passenger access into the seat unit from the aisle;
    the seat comprises a seat pan without the leg rest directly extending from the seat pan, and backrest, the seat having an upright sitting configuration in which the backrest is substantially upright;
    the seat is movable in the upright sitting configuration from a first position to a second position;
    in the first position of the seat a front edge of the seat pan is spaced apart from the footrest such that the console is positioned between a lateral edge of the seat pan and the aisle and such that the lateral edge of the seat pan is spaced apart from the access path,
    in the second position of the seat the front edge of the seat pan touches the footrest such that the footrest and seat pan together form a surface without the leg rest and such that the lateral edge of the seat pan is positioned in the access path, between the console and the footrest; and
    the movable panel is movable with respect to the footrest between a closed position in which the movable panel at least partially encloses a side of the footrest and an open position in which the movable panel at least partially exposes the side of the footrest such that, in use, when the seat is in the second position and the panel is in the open position, a passenger can access the surface formed by the footrest and seat pan from the aisle through the partially exposed side of the footrest and across the lateral edge of the seat pan.

2. The aircraft passenger seat unit according to claim 1, wherein the seat faces in a direction defining a seat axis, and wherein the seat is movable along the seat axis towards or away from the footrest when the seat is moved between the first and second positions.

3. The aircraft passenger seat unit according to claim 1, wherein the seat unit has an aisle side that is configured to be adjacent an aisle in use, and wherein the movable panel is positioned along the aisle side of the seat unit when in the closed position such that movable panel at least partially encloses the side of the footrest to block access to the side of the footrest from the aisle, and such that when the panel is in the open position a passenger can access the at least partially exposed side of the footrest from the aisle.

4. The aircraft passenger seat unit according to claim 1, wherein the console comprises a table surface for use by a passenger of the seat unit.

5. The aircraft passenger seat unit according to claim 4, wherein the aircraft passenger seat unit is configured to be positioned directly adjacent to and in front of a further, substantially identical aircraft seat unit, and wherein the console is at least partially formed by the movable panel of the further seat unit.

6. The aircraft passenger seat unit according to claim 5 further comprising a shell, wherein the shell forms the console of the seat unit and the movable panel of the further seat unit.

7. The aircraft passenger seat unit according to claim 1, wherein the movable panel is movably mounted via a hinge.

8. The aircraft passenger seat unit according to claim 7, wherein the movable panel is mounted via a hinge and configured to be moved between the closed position and open position about a horizontal axis located towards a bottom of the panel.

9. The aircraft passenger seat unit according to claim 7, wherein the movable panel is mounted via a hinge and configured to be moved between the closed position and open position about a vertical axis located towards a side of the panel.

10. The aircraft passenger seat unit according to claim 1, wherein the seat unit comprises a locking system configured to lock the movable panel in the closed position, the lock system comprising:
    a plurality of latches positioned on the movable panel and configured to engage with a structure of the seat unit to lock the movable panel in the closed position, or
    a plurality of latches positioned on the structure of the seat unit and configured to engage with the movable panel to lock the movable panel in the closed position.

11. The aircraft passenger seat unit according to claim 10, wherein the lock system comprises an actuatable member operable to disengage the latches so that the movable panel can be moved from the closed position to the open position.

12. The aircraft passenger seat unit according to claim 11, wherein the actuatable member is positioned on a surface of the movable panel that is adjacent the footrest when the panel is in the closed position.

13. The aircraft passenger seat unit according to claim 1, wherein the movable panel is rotatably mounted with respect to the footrest and the movable panel is rotatable between the closed position and the open position.

14. An aircraft passenger seat unit, configured for use adjacent an aisle of an aircraft cabin, wherein:
    the seat unit comprises:
        a seat,
        a footrest, and
        a movable panel,
        wherein the seat unit does not include a leg rest extending from the seat;
    the seat comprises a seat pan without the leg rest directly extending from the seat pan, and backrest, the seat having an upright sitting configuration in which the backrest is substantially upright;
    the seat is movable in the upright sitting configuration from a first position in which the seat pan is spaced apart from the footrest to a second position in which a front edge of the seat pan touches the footrest such that the footrest and seat pan together form a surface without the leg rest; and
    the movable panel is movable with respect to the footrest between a closed position in which the movable panel at least partially encloses a side of the footrest and an open position in which the movable panel at least partially exposes the side of the footrest such that, in use, when the seat is in the second position and the panel is in the open position, a passenger can access the surface formed by the footrest and seat pan from an aisle through the partially exposed side of the footrest.

15. An aircraft passenger seat unit, configured for use adjacent an aisle of an aircraft cabin, wherein:
    the seat unit comprises
        a seat,
        a footrest, and
        a movable panel,
        wherein the seat unit does not include a leg rest extending from the seat;
    the seat comprises a seat pan without the leg rest directly extending from the seat pan, and backrest, the seat having an upright sitting configuration in which the backrest is substantially upright;
    the seat is movable in the upright sitting configuration from a first position in which the seat pan is spaced apart from the footrest to a second position in which the seat pan touches the footrest such that the footrest and seat pan together form a surface without the leg rest;
    the movable panel is rotatably mounted with respect to the footrest via a hinge; and
    the movable panel is rotatable between a closed position in which the movable panel at least partially encloses a side of the footrest and an open position in which the movable panel at least partially exposes the side of the footrest such that, in use, when the seat is in the second position and the panel is in the open position, a passenger can access the surface formed by the footrest and seat pan from an aisle through the partially exposed side of the footrest.

16. The aircraft passenger seat unit according to claim 1, wherein the movable panel is configured to rotate into the aisle when moving from the closed position to the open position.

* * * * *